US007461627B2

(12) United States Patent
Liu et al.

(10) Patent No.: US 7,461,627 B2
(45) Date of Patent: Dec. 9, 2008

(54) HYBRID COMBUSTION IN A DIESEL ENGINE

(75) Inventors: Zhengbai Liu, Naperville, IL (US); Puning Wei, Naperville, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 62 days.

(21) Appl. No.: 11/380,537

(22) Filed: Apr. 27, 2006

(65) Prior Publication Data

US 2007/0251234 A1 Nov. 1, 2007

(51) Int. Cl.
*F02B 17/00* (2006.01)
*F02B 5/00* (2006.01)
*F02B 33/44* (2006.01)
*F02M 25/07* (2006.01)
*F02D 17/02* (2006.01)

(52) U.S. Cl. ............... 123/295; 123/568.21; 123/568.2; 123/305; 123/481; 60/605.2; 60/601; 701/108

(58) Field of Classification Search ............... 60/605.2, 60/601; 123/568.21, 568.2, 294–295, 305, 123/481; 701/108
See application file for complete search history.

(56) References Cited

U.S. PATENT DOCUMENTS

| 5,785,031 | A | 7/1998 | Akimoto et al. ............. 123/295 |
| 5,832,880 | A | 11/1998 | Dickey ........................ 123/295 |
| 5,875,743 | A | 3/1999 | Dickey ................... 123/568.21 |
| 5,881,693 | A | 3/1999 | Mizuno ....................... 123/295 |
| 5,896,840 | A | 4/1999 | Takahashi ................... 123/295 |
| 5,937,822 | A | 8/1999 | Nakajima .................. 123/295 |
| 6,390,054 | B1 * | 5/2002 | Yang ........................... 123/295 |
| 6,662,785 | B1 | 12/2003 | Sloane et al. ............... 123/481 |
| 6,684,849 | B2 | 2/2004 | zur Loye et al. ........... 123/295 |
| 6,725,838 | B2 | 4/2004 | Shafer et al. ................ 123/305 |
| 6,840,209 | B2 | 1/2005 | Shimazaki .................. 123/305 |
| 6,957,640 | B1 * | 10/2005 | Liu et al. ..................... 123/305 |
| 7,017,561 | B1 * | 3/2006 | Liu et al. ............... 123/568.12 |
| 7,021,276 | B2 * | 4/2006 | Liu et al. ..................... 123/305 |
| 7,121,255 | B2 * | 10/2006 | Liu et al. ..................... 123/305 |
| 7,255,095 | B1 * | 8/2007 | Brevick et al. ............. 60/605.2 |
| 7,343,902 | B2 * | 3/2008 | Brevick et al. ............. 123/481 |
| 2003/0145836 | A1 | 8/2003 | Linna et al. ............ 123/568.21 |
| 2004/0182359 | A1 | 9/2004 | Stewart et al. ............. 123/295 |
| 2008/0027618 | A1 * | 1/2008 | Liu et al. .................... 701/101 |

OTHER PUBLICATIONS

Vafidis, C., "The Application of an Electro-hydraulic VVA System on a Passenger Car C.R. Diesel Engine," ATA (Associacioni Tecnica De Automobile) Congress, Porto Cervo, Italy, Oct. 12-13, 2000, Paper No. 20A2011.

* cited by examiner

*Primary Examiner*—Thai-Ba Trieu
(74) *Attorney, Agent, or Firm*—Jeffrey P. Calfa; Jack D. Nimz

(57) ABSTRACT

A compression ignition engine (10) has a control system (40), one or more combustion chambers (12), and fuel injectors (42, 44) for injecting fuel into the combustion chambers. The control system controls fueling using a result of the processing of engine speed and engine load to select a particular domain for engine operation (HCCI, HCCI+CD, or CD, —FIG. 1). When the processing selects HCCI, the engine is fueled to cause alternative diesel combustion (such as HCCI) in all combustion chambers. When the processing selects CD, all combustion chambers are fueled for conventional diesel combustion. When the processing selects HCCI+CD, a first group of combustion chambers are fueled for HCCI combustion and a second group for CD combustion. Each group (G1, G2) has its own EGR valve (34, 38) and turbocharger (22, 24).

6 Claims, 2 Drawing Sheets

FIG. 1
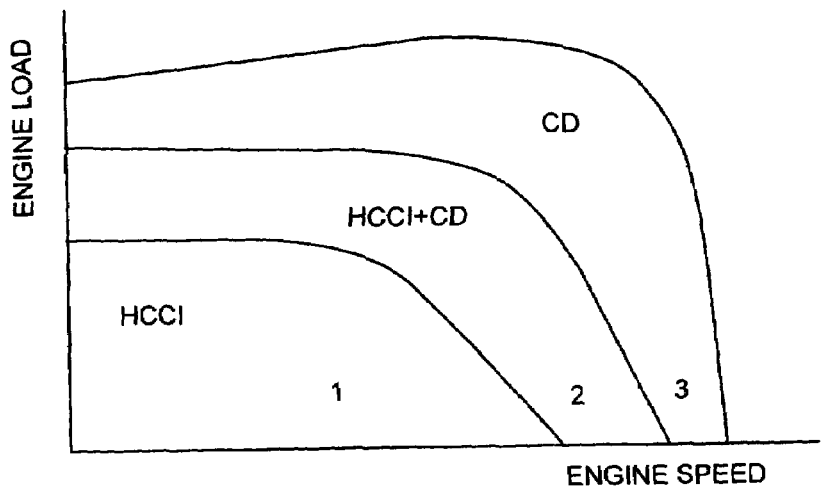
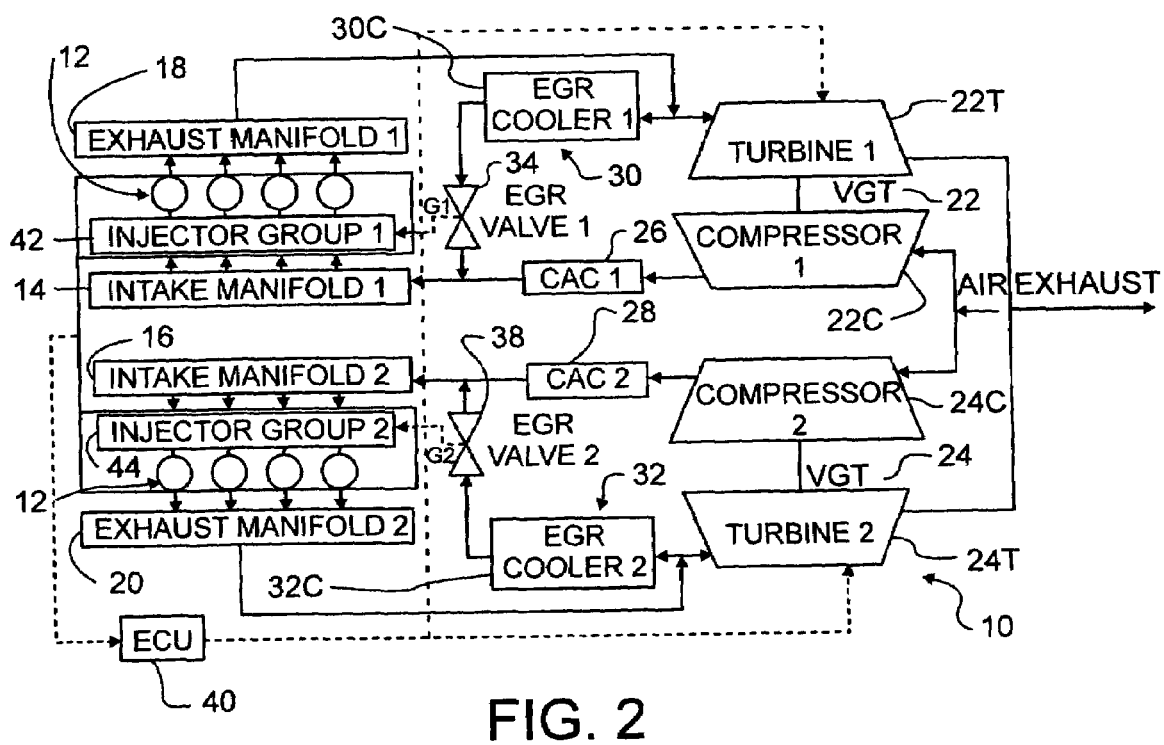
FIG. 2

US 7,461,627 B2

HYBRID COMBUSTION IN A DIESEL ENGINE

FIELD OF THE INVENTION

This invention relates generally to internal combustion engines. More specifically the invention relates to a diesel engine and to a strategy for engine operation selectively using alternative diesel combustion and conventional diesel combustion such that alternative diesel combustion occurs in all cylinders at relatively lower engine speeds and relatively smaller engine loads, in fewer than all cylinders at increased engine speeds and larger loads (hybrid combustion), and in no cylinders at highest speeds and loads.

BACKGROUND OF THE INVENTION

HCCI is a known process for fueling a diesel engine in a manner that creates a substantially homogeneous air-fuel charge inside an engine cylinder during a compression upstroke of an engine cycle. After a desired quantity of fuel for the charge has been injected into the cylinder to create a substantially homogeneous air-fuel mixture, the increasing compression of the charge by the upstroking piston creates sufficiently large pressure to cause auto-ignition of the charge. In other words, the HCCI mode of operation of a diesel engine may be said to comprise 1) injecting a desired amount of fuel into a cylinder at an appropriate time during the compression upstroke so that the injected fuel mixes with charge air that has entered the cylinder during the preceding intake downstroke and early portion of the compression upstroke in a manner that forms a substantially homogeneous mixture within the cylinder, and then 2) increasingly compressing the mixture to the point of auto-ignition near or at top dead center (TDC). Auto-ignition may occur as the substantially simultaneous spontaneous combustion of vaporized fuel at various locations within the mixture. No additional fuel is injected after auto-ignition.

One of the attributes of HCCI is that relatively lean, or dilute, mixtures can be combusted, keeping the combustion temperatures relatively low. By avoiding the creation of relatively higher combustion temperatures, HCCI can yield significant reductions in the generation of $NO_X$, an undesired constituent of engine exhaust gas.

Another attribute of HCCI is that auto-ignition of a substantially homogeneous air-fuel charge generates more complete combustion and consequently relatively less soot in engine exhaust.

The potential benefit of HCCI on reducing tailpipe emissions is therefore rather significant, and consequently HCCI is a subject of active investigation and development by scientists and engineers.

HCCI may be considered one of several alternative combustion processes for a compression ignition engine. Other processes that may be considered alternative combustion processes include Controlled Auto-Ignition (CAI), Dilution Controlled Combustion Systems (DCCS), and Highly Premixed Combustion Systems (HPCS).

By whatever name an alternative combustion system or process may be called, a common attribute is that fuel is injected into a cylinder well before TDC to form an air-fuel charge that is increasingly compressed until auto-ignition occurs near or at top dead center (TDC).

A diesel engine that powers a motor vehicle operates over a range of speeds and loads. Because the rate of HCCI combustion is more difficult to control at engine higher speeds and larger loads, prevailing engine control strategies that use HCCI typically limit HCCI use to lower engine speeds and smaller loads. At higher engine speeds and larger engine loads, those strategies revert to conventional diesel (CD) combustion.

The nature of a diesel engine and the commercial availability of fuel injection systems that can control fuel injection with great precision allow fuel to be injected as a series of individual injections during an engine cycle. Hence known fueling systems in diesel engines can serve to control injection of fuel for both CD combustion and HCCI combustion.

CD fuel injection during an engine cycle is sometimes described by its particular fueling pulses, such as pilot injection pulses, main injection pulses, and post-injection pulses. Any particular fuel injection process typically always comprises at least one main fuel injection pulse, with one or more pilot and/or post-injection pulses being optional possibilities.

Contemporary fuel injection systems allow injection pressure, injection rate, and injection timing to be controlled with high degrees of precision so that fuel can be injected into a cylinder in precise quantities at precise times during an engine cycle. That is why known fuel injection and associated processing systems can handle both CD and HCCI combustion.

As will be explained by later description, the present invention takes advantage of the capabilities of those fuel injection and processing systems to control fuel injections in different ways depending on certain aspects of engine operation. Exactly how any particular fuel injection system will be controlled by an associated processing system in any given engine will depend on specifics of the engine, the fuel injection system, and the processing system.

Because a diesel engine that powers a motor vehicle runs at different speeds and loads depending on various inputs to the vehicle and engine that influence engine operation, fueling requirements change as speed and load change. An associated processing system processes data indicative of parameters such as engine speed and engine load to develop control data for setting desired engine fueling for particular operating conditions that will assure proper control of the fuel injection system for various combinations of engine speed and engine load.

SUMMARY OF THE INVENTION

The present invention relates to an engine and strategy of engine operation for extending the speed/load range over which alternative diesel combustion can be used. Consequently, fewer undesired constituents in engine exhaust, especially soot and $NO_X$, will be generated in the extension of the range. The invention is embodied in the fuel injection control strategy, a strategy that is programmed in an associated processing system, in conjunction with control of two separate turbochargers and two separate EGR systems.

One generic aspect of the present invention relates to a method of operating a compression ignition engine having multiple combustion chambers. Certain data is processed to select one of plural fueling modes for operating the engine.

When the result of the processing selects a first fueling mode, each combustion chamber is fueled during an engine cycle to cause alternative diesel combustion, a first turbocharger is operated to create charge air in a first intake manifold serving a first group of combustion chambers, exhaust gas from the first group of combustion chambers is recirculated through a first EGR valve to the first intake system, a second turbocharger is operated to create charge air in a second intake manifold serving a second group of combustion chambers, and exhaust gas from the second group of combustion chambers is recirculated through a second EGR valve to the second intake system.

When the result of the processing selects a second fueling mode, each combustion chamber is fueled during an engine cycle to cause conventional diesel combustion, the first turbocharger is operated to create charge air in the first intake manifold, exhaust gas from the first group of combustion chambers is recirculated through the first EGR valve to the first intake system, the second turbocharger is operated to create charge air in the second intake manifold, and exhaust gas from the second group of combustion chambers is recirculated through the second EGR valve to the second intake system.

When the result of the processing selects a third fueling mode, each combustion chamber of the first group is fueled during an engine cycle to cause alternative diesel combustion, fueling each combustion chamber of the second group is fueled during an engine cycle to cause conventional diesel combustion, the first turbocharger is operated to create charge air in the first intake manifold, exhaust gas from the first group of combustion chambers is recirculated through the first EGR valve to the first intake system, the second turbocharger is operated to create charge air in the second intake manifold, and exhaust gas is recirculated from the second group of combustion chambers through the second EGR valve to the second intake system.

Another generic aspect of the invention relates to an engine that operates according to the method just described.

The foregoing, along with further features and advantages of the invention, will be seen in the following disclosure of a presently preferred embodiment of the invention depicting the best mode contemplated at this time for carrying out the invention. This specification includes drawings, now briefly described as follows.

BRIEF DESCRIPTION OF THE DRAWINGS

FIG. 1 is a speed-load diagram showing various combustion domains in accordance with principles of the present invention.

FIG. 2 is a general schematic diagram of portions of an exemplary diesel engine relevant to principles of the present invention.

DESCRIPTION OF THE PREFERRED EMBODIMENT

Figure 3:
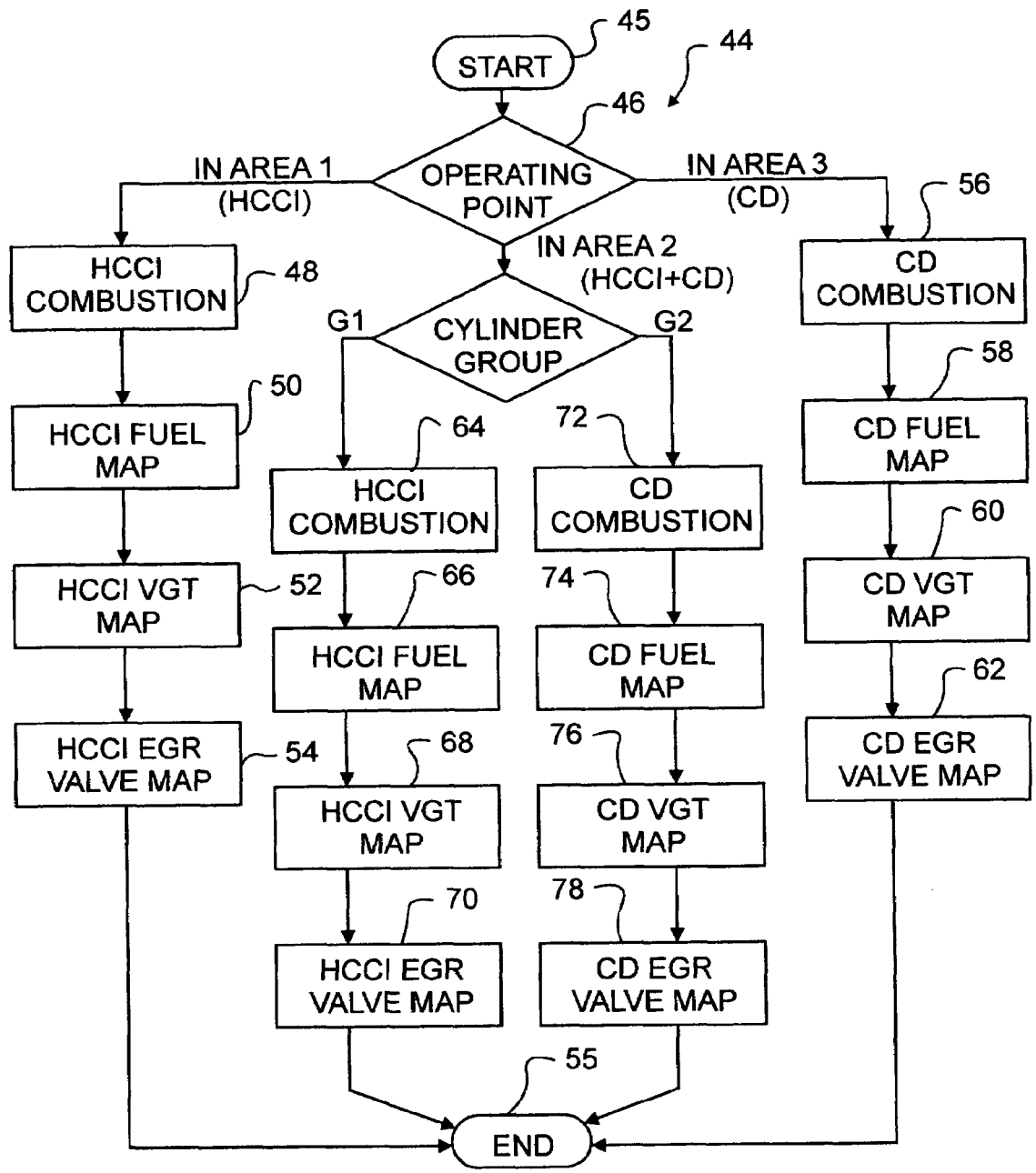
FIG. 3 is a flow diagram illustrating an embodiment of the inventive strategy.

The present invention relates to a hybrid combustion strategy for extending the range of diesel engine operation over which advantage may be taken of HCCI combustion. FIG. 1 is a graph whose vertical axis represents engine load and whose horizontal axis represents engine speed. At the origin of the graph, engine load is zero, and engine speed is zero. In accordance with the inventive strategy, FIG. 1 shows diesel engine operation in distinct domains designated HCCI, HCCI+CD, and CD with respective solid lines demarcating the domains.

The diesel engine operates by HCCI combustion in domain HCCI (domain 1), by HCCI+CD combustion in domain HCCI+CD (domain 2), and by CD combustion in domain CD (domain 3). As shown, HCCI combustion occurs in the domain having lowest engine speeds and smallest engine loads while CD combustion occurs in the domain having highest engine speeds and largest engine loads. HCCI+CD combustion occurs in a domain that is intermediate the other two.

FIG. 2 shows a schematic of a diesel engine 10 that utilizes the inventive strategy for powering a motor vehicle. Engine 10 is a multi-cylinder engine that comprises cylinders 12 within which pistons reciprocate. Each piston is coupled to a respective throw of a crankshaft by a corresponding connecting rod.

For purposes of implementing the invention, cylinders 12 are divided into multiple groups. In the example here of an eight-cylinder engine, there are two groups of four cylinders each. In a V-type diesel engine one group G1 can be one bank of cylinders, whereas the other group G2 can be the other cylinder bank. For an in-line I-6 diesel engine with six cylinders (not shown in the drawing), cylinders 1, 3, and 5 may form the first cylinder group, whereas cylinders 2, 4, and 6 may form the second cylinder group.

Each group of cylinders has its intake manifold, its own exhaust manifold, its own EGR system, and its own turbocharger system. Hence, an intake manifold 14 serves cylinders 12 of group G1, and an intake manifold 16 serves cylinders 12 of group G2. An exhaust manifold 18 serves cylinders 12 of group G1, and an exhaust manifold 20 serves cylinders 12 of group G2. A turbocharger 22 is associated with manifolds 14 and 18, while a turbocharger 24 is associated with manifolds 16 and 20.

Each turbocharger is of the variable geometry type and comprises a respective compressor 22C, 24C and a respective turbine 22T, 24T. A respective charge air cooler 26, 28 cools the charge air created by the respective compressor 22C, 24C before the charge air enters the respective intake manifold 14, 16.

A respective EGR system 30, 32 is associated with each cylinder group. EGR system 30 comprises an EGR cooler 30C and an EGR valve 34 that allow exhaust gases from exhaust manifold 18 to be delivered for entrainment with charge air entering intake manifold 14. EGR system 32 comprises an EGR cooler 32C and an EGR valve 38 that allow exhaust gases from exhaust manifold 20 to be delivered for entrainment with charge air entering intake manifold 16.

Engine 10 has a fueling system that comprises fuel injectors for injecting diesel fuel into cylinders 12. Engine also has a processor-based engine control unit (ECU) 40 that processes data from various sources to develop various control data for controlling various aspects of engine operation. The data processed by ECU 40 may originate at external sources, such as various sensors and/or be generated internally. Examples of data processed may include engine speed, intake manifold pressure, exhaust manifold pressure, fuel injection pressure, fueling quantity and timing, mass airflow, and accelerator pedal position.

ECU 40 controls the injection of fuel into cylinders 12 by controlling the operation of the fueling system, including controlling the operation of the fuel injectors. The processing system embodied in ECU 40 can process data sufficiently fast to calculate, in real time, the timing and duration of device actuation to set both the timing and the amount of each injection of fuel into a cylinder. Such control capability is used to implement the inventive strategy.

The group of fuel injectors that inject fuel into the cylinders of group G1 are designated by the reference numeral 42 while the group of fuel injectors that inject fuel into the cylinders of group G2 are designated by the reference numeral 44.

ECU 40 also controls both turbochargers 22, 24 and both EGR valves 34, 38.

ECU 40 comprises a processing system that includes stores for storing two maps for control of the two turbochargers. One map is a HCCI VGT map that is used for selecting turbocharger vane position to control intake manifold boost pressure and exhaust manifold back-pressure during HCCI combustion, while the other map is a CD map that is used to select turbocharger vane position to control intake manifold boost pressure and exhaust manifold back-pressure during CD combustion.

The processing system of ECU 40 also comprises stores for storing two maps for control of the two EGR valves. One is a HCCI EGR valve map that selects the extent to which the EGR valve opens to control the EGR percentage during HCCI combustion, and the other is a CD EGR valve map that selects the extent to which EGR valve opens to control the EGR percentage during CD combustion.

The processing system also comprises stores for storing two fuel injection maps for the fuel system. One is a HCCI fuel injection map that controls the fuel injection pressure, the fuel injection quantity, the fuel injection timing, the number of fuel injections, and the rate of injection, during HCCI combustion, and the other is a CD fuel injection map that controls the fuel injection pressure, the fuel injection quantity, the fuel injection timing, the number of fuel injections, and the rate of injection, during CD combustion.

It is understood that each of the maps referred to above may comprise multiple individual maps that collectively form what has been for convenience called a map. Various inputs to the various maps result in selection of proper data values from the maps for fuel, turbocharger, and EGR control.

FIG. 3 shows a logic flow diagram 44 of the inventive strategy that is implemented in ECU 40 as an algorithm that is repeatedly executed by the processing system, enabling engine 10 to operate by hybrid combustion. The algorithm commences at a start 45 and then a decision point 46 for determining the combustion processes in the respective cylinder groups G1, G2.

The decision point processes data relevant to engine operation, specifically engine speed and load with reference to FIG. 1, to determine in which of the three domains HCCI, HCCI+CD, and CD, the engine is currently operating.

If decision point 46 determines that the engine is operating in the HCCI domain, ECU 40 fuels the cylinders of both groups G1, G2 for HCCI combustion using an HCCI fueling map, operates turbochargers 22, 24 consistent with HCCI combustion using an HCCI VGT map, and operates EGR valves 34, 38 consistent with HCCI combustion using an HCCI EGR Valve map, as marked at 48, 50, 52, 54 respectively in FIG. 3. Each iteration of the algorithm ends at 55.

If decision point 46 determines that the engine is operating in the CD domain, ECU 40 fuels the cylinders of both groups G1, G2 for CD combustion using a CD fueling map, operates turbochargers 22, 24 consistent with CD combustion using a CD VGT map, and operates EGR valves 34, 38 consistent with HCCI combustion using a CD EGR Valve map, as marked at 56, 58, 60, 62 respectively in FIG. 3.

If decision point 46 determines that the engine is operating in the HCCI+CD domain, one of the two cylinder groups G1, G2 fueled for HCCI combustion and the other group is fueled for CD combustion. For example, if cylinder group G1 is fueled for HCCI combustion, cylinder group G2 is fueled for CD combustion mode, and vice versa.

When group G1 is fueled for HCCI combustion with the engine operating in the HCCI+CD domain, ECU 40 operates fuel injector group 42 using the HCCI fueling map, operates turbocharger 22 using the HCCI VGT map, and operates EGR valve 34 using the HCCI EGR valve map, as marked by reference numerals 64, 66, 68, 70. With group G2 being fueled for CD combustion, ECU 40 operates fuel injector group 44 using the CD fueling map, operates turbocharger 24 using the CD VGT map, and operates EGR valve 38 using the CD EGR valve map, as marked by reference numerals 72, 74, 76, 78. In each fueling mode, turbocharger operation and EGR valve operation are controlled by appropriate maps for the respective mode.

An advantage of the present invention is significant reduction in both NOx and soot emissions from diesel engines.

In the HCCI domain, the engine operates by HCCI combustion, that is, both cylinder groups G1, G2 work in the HCCI combustion mode, which produces very low NOx and soot emissions.

In the HCCI+CD domain, the engine works in the HCCI+CD manner; that is, one cylinder group works in the HCCI combustion manner to generate very low emissions, whereas the other cylinder group works in the CD combustion manner. Thus, in the HCCI+CD domain, the resulting emissions can be reduced almost in half, in comparison with operation of both groups by CD combustion over the same range as that of the HCCI+CD domain. It should be pointed out that the cylinder group operating by HCCI combustion is fueled to provide the largest possible torque contribution to total torque consistent with HCCI combustion, while the cylinder group being fueled for CD combustion makes up the difference required. For any given speed in the HCCI+CD mode, the fuel delivered into the HCCI cylinders is fixed, i.e., the fuel map is substantially constant, and does not change as load changes. However, as the engine speed changes in the HCCI+CD mode from one speed to another, the fuel delivered into HCCI cylinders changes from one fixed amount corresponding to maximum allowable fueling at the former speed to another fixed amount corresponding to the maximum allowable fueling at the new speed. Hence, HCCI fueling is a function of engine speed, but not engine load in the HCCI+CD mode.

The HCCI domain covers an area that comprises various combinations of relatively smaller engine loads and relatively lower engine speeds. The HCCI+CD domain covers an area that comprises various combinations of relatively larger engine loads and relatively higher engine speeds than those of the HCCI domain.

HCCI fueling may have one or more discrete injections. Regardless of the number of discrete injections, HCCI operation results from introducing fuel into a cylinder during a compression upstroke of the piston that reciprocates in the cylinder. The fuel mixes with charge air that entered the cylinder during the immediately preceding intake downstroke and early portion of the compression upstroke, and the resulting air-fuel mixture is a substantially homogeneous one. The HCCI fueling concludes before any combustion occurs. When the charge has been compressed sufficiently to auto-ignite, HCCI combustion commences.

CD fueling may also have one or more discrete injections.

Advantages of the invention include: concurrent reductions in both $NO_X$ and soot; ability to cover the entire operating range of an engine by virtue of the three domains that have been described; use in heavy-duty, medium-duty, and light-duty diesel engines.

While a presently preferred embodiment of the invention has been illustrated and described, it should be appreciated that principles of the invention apply to all embodiments falling within the scope of the following claims.

What is claimed is:

1. A method of operating a compression ignition engine having multiple combustion chambers comprising:

processing certain data to select one of plural fueling modes for operating the engine, and a) when the result of the processing selects a first fueling mode, i) fueling each combustion chamber during an engine cycle to cause alternative diesel combustion, ii) operating a first turbocharger to create charge air in a first intake manifold serving a first group of combustion chambers, iii) recirculating exhaust gas from the first group of combustion chambers through a first EGR valve to the first intake manifold, iv) operating a second turbocharger to create charge air in a second intake manifold serving a second group of combustion chambers, v) recirculating exhaust gas from the second group of combustion chambers through a second EGR valve to the second intake manifold;

b) when the result of the processing selects a second fueling mode, i) fueling each combustion chamber during an engine cycle to cause conventional diesel combustion, ii) operating the first turbocharger to create charge air in the first intake manifold, iii) recirculating exhaust gas from the first group of combustion chambers through the first EGR valve to the first intake manifold, iv) operating the second turbocharger to create charge air in the second intake manifold, v) recirculating exhaust gas from the second group of combustion chambers through the second EGR valve to the second intake manifold, and c) when the result of the processing selects a third fueling mode, i) fueling each combustion chamber of the first group during an engine cycle to cause alternative diesel combustion, ii) fueling each combustion chamber of the second group during an engine cycle to cause conventional diesel combustion, iii) operating the first turbocharger to create charge air in the first intake manifold, iv) recirculating exhaust gas from the first group of combustion chambers through the first EGR valve to the first intake manifold, v) operating the second turbocharger to create charge air in the second intake manifold, and vi) recirculating exhaust gas from the second group of combustion chambers through the second EGR valve to the second intake manifold.

2. A method as set forth in claim 1 wherein the step of processing certain data to select one of plural fueling modes for operating the engine comprises processing engine speed data and engine load data to select step a) when the processing of engine speed data and engine load data discloses engine operation in a speed/load domain defined by relatively low engine speed and relatively small engine load, to select step b) when the processing of engine speed data and engine load data discloses engine operation in a speed/load domain defined by relatively high engine speed and relatively large engine load, and to select step c) when the processing of engine speed data and engine load data discloses engine operation in a speed/load domain defined by engine speed that is intermediate the relatively low and the relatively high engine speeds and by engine load that is intermediate the relatively small and the relatively large engine loads.

3. A method as set forth in claim 2 wherein in a graph of engine speed vs. engine load whose origin corresponds to zero speed and zero load, the speed/load domain defined by relatively low engine speed and relatively small engine load bounds the origin, the speed/load domain defined by engine speed that is intermediate the relatively low and the relatively high engine speeds and by engine load that is intermediate the relatively small and the relatively large engine loads bounds the speed/load domain defined by relatively low engine speed and relatively small engine load, and the speed/load domain defined by relatively high engine speed and relatively large engine load bounds the speed/load domain defined by engine speed that is intermediate the relatively low and the relatively high engine speeds and by engine load that is intermediate the relatively small and the relatively large engine loads.

4. A compression ignition engine comprising:

a control system for processing data;

multiple combustion chambers;

a fueling system for injecting fuel into the combustion chambers;

a first turbocharger for creating charge air in a first intake manifold serving a first combustion chamber group formed by some of the combustion chambers, a second turbocharger for creating charge air in a second intake manifold serving a second combustion chamber group formed by the remaining combustion chambers, a first exhaust gas recirculation system for recirculating exhaust gas from the first combustion chamber group through a first EGR valve to the first intake manifold; and a second exhaust gas recirculation system for recirculating exhaust gas from the second combustion chamber group through a second EGR valve to the second intake manifold;

wherein the control system controls the fueling system using a result of the processing of certain data by the control system to select one of plural fueling modes for operating the engine such that a) when the result of the processing selects a first fueling mode, each combustion chamber is fueled during an engine cycle to cause alternative diesel combustion, b) when the result of the processing selects a second fueling mode, each combustion chamber is fueled during an engine cycle to cause conventional diesel combustion, and c) when the result of the processing selects a third fueling mode, each combustion chamber of the first group is fueled during an engine cycle to cause alternative diesel combustion and each combustion chamber of the second group is fueled during an engine cycle to cause conventional diesel combustion, wherein the control system controls both the first and second turbochargers using a result of the processing of certain data by the control system to control turbocharger operation in each fueling mode consistent with the respective mode, and wherein the control system controls both the first and second EGR valves using a result of the processing of certain data by the control system to control exhaust gas recirculation in each fueling mode consistent with the respective mode.

5. An engine as set forth in claim 4 wherein control system processes engine speed data and engine load data to select the first fueling mode when the processing of engine speed data and engine load data discloses engine operation in a speed/load domain defined by relatively low engine speed and relatively small engine load, to select the second fueling mode when the processing of engine speed data and engine load data discloses engine operation in a speed/load domain defined by relatively high engine speed and relatively large engine load, and to select the third fueling mode when the processing of engine speed data and engine load data discloses engine operation in a speed/load domain defined by engine speed that is intermediate the relatively low and the relatively high engine speeds and by engine load that is intermediate the relatively small and the relatively large engine loads.

6. An engine as set forth in claim 5 wherein in a graph of engine speed vs. engine load whose origin corresponds to zero speed and zero load, the speed/load domain defined by relatively low engine speed and relatively small engine load bounds the origin, the speed/load domain defined by engine speed that is intermediate the relatively low and the relatively high engine speeds and by engine load that is intermediate the relatively small and the relatively large engine loads bounds the speed/load domain defined by relatively low engine speed and relatively small engine load, and the speed/load domain defined by relatively high engine speed and relatively large engine load bounds the speed/load domain defined by engine speed that is intermediate the relatively low and the relatively high engine speeds and by engine load that is intermediate the relatively small and the relatively large engine loads.

* * * * *